United States Patent
Osawa et al.

(10) Patent No.: US 11,250,246 B2
(45) Date of Patent: Feb. 15, 2022

(54) EXPRESSION RECOGNITION DEVICE

(71) Applicant: Mitsubishi Electric Corporation, Tokyo (JP)

(72) Inventors: Shunya Osawa, Tokyo (JP); Takahiro Otsuka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/756,550

(22) PCT Filed: Nov. 27, 2017

(86) PCT No.: PCT/JP2017/042418
§ 371 (c)(1),
(2) Date: Apr. 16, 2020

(87) PCT Pub. No.: WO2019/102619
PCT Pub. Date: May 31, 2019

(65) Prior Publication Data
US 2020/0293764 A1 Sep. 17, 2020

(51) Int. Cl.
G06K 9/00 (2006.01)
(52) U.S. Cl.
CPC ..... *G06K 9/00308* (2013.01); *G06K 9/00255* (2013.01); *G06K 9/00281* (2013.01)
(58) Field of Classification Search
CPC ........... G06K 9/00281; G06K 9/00302; G06K 9/00308; G06K 9/00255; G06K 9/00228; G06T 7/00
See application file for complete search history.

(56) References Cited

U.S. PATENT DOCUMENTS

2008/0181508 A1 7/2008 Kaneda et al.
2009/0110248 A1 4/2009 Masuda et al.
(Continued)

FOREIGN PATENT DOCUMENTS

| EP | 1 953 675 A1 | 8/2008 |
| JP | 2007-257221 A | 10/2007 |
| JP | 2007-280250 A | 10/2007 |

OTHER PUBLICATIONS

Facial Expression Recognition Using Image Processing Techniques and Neural Networks (Year: 2013).*

(Continued)

*Primary Examiner* — Nizar N Sivji
(74) *Attorney, Agent, or Firm* — Birch, Stewart, Kolasch & Birch, LLP

(57) ABSTRACT

An expression recognition device includes processing circuitry to acquire an image; extract a face area of a person from the acquired image and obtaining a face image added with information of the face area; extract one or more face feature points on a basis of the face image; determine a face condition representing a state of a face in the face image depending on reliability of each of the extracted face feature points; determine a reference point for extraction of a feature amount used for expression recognition from among the extracted face feature points depending on the determined face condition; extract the feature amount on a basis of the determined reference point; recognize a facial expression of the person in the face image using the extracted feature amount; and output information related to a recognition result of the facial expression of the person in the face image.

7 Claims, 13 Drawing Sheets

(56) References Cited

U.S. PATENT DOCUMENTS

| | | | |
|---|---|---|---|
| 2010/0189358 A1* | 7/2010 | Kaneda | G06K 9/00744 |
| | | | 382/195 |
| 2013/0070973 A1* | 3/2013 | Saito | G06K 9/00228 |
| | | | 382/118 |
| 2013/0322770 A1* | 12/2013 | Kaneda | G06K 9/00315 |
| | | | 382/201 |
| 2014/0119618 A1* | 5/2014 | Kim | G06K 9/00275 |
| | | | 382/118 |
| 2017/0098122 A1 | 4/2017 | Kaliouby et al. | |
| 2017/0286759 A1* | 10/2017 | Yao | G06K 9/00315 |
| 2018/0005019 A1* | 1/2018 | Chattopadhyay | G06K 9/4642 |
| 2018/0308114 A1* | 10/2018 | Deng | G06K 9/00221 |
| 2019/0116323 A1* | 4/2019 | Kim | H04N 5/2621 |
| 2019/0325198 A1* | 10/2019 | Friedland | G06K 9/00771 |

OTHER PUBLICATIONS

Different Face Regions Detection Based Facial Expression Recognition (Year: 2015).*

Intelligent System for Automatic Adjustment of 3D Facial Shape Model and Face Expression Recognition (Year: 1999).*

Learning Spatial Weighting via Quadratic Programming for Facial Expression Analysis (Year: 2010).*

Understanding Presumption System from Facial Images (Year: 1999).*

Automatic Analysis of Facial Expressions: The State of the Art (Year: 2000).*

3D Smiling Facial Expression Recognition Based on SVM (Year: 2016).*

Facial Expression Recognition with 3D Deformable Models (Year: 2009).*

3D Face Recognition with Geometrically Localized Surface Shape Indexes (Year: 2006).*

Real-Time Adaptive Data-Driven Perception for Anomaly Priority Scoring At Scale (Year: 2017).*

Intelligent Facial Expression Recognition with Unsupervised Facial Point Detection and Evolutionary Feature Optimization (Year: 2016).*

Viola et al., "Robust Real-Time Face Detection" International Journal of Computer Vision, vol. 57, No. 2, Jan. 10, 2004, pp. 137-154.

Wiskott et al., "Face Recognition by Elastic Bunch Graph Matching", Institut für Neuroinformatik, Ruhr-Universität Bochum, FRG: Internal Report 96-08, IR-INI 96-08, ISSN 0943-2752, Apr. 1996, pp. 1-21 (Total pg. No. 22).

German Office Action of German Application No. 112017008174.2 dated Apr. 15, 2021 with English translation.

* cited by examiner

FIG. 2

| Feature Point | Coordinates |
| --- | --- |
| Left Eyebrow Outer Edge | (50, 50) |
| Left Eyebrow Inner Edge | (70, 52) |
| Left Eye Outer Edge | (40, 65) |
| Left Eye Inner Edge | (65, 70) |
| Nose Center | (90, 90) |
| Mouth Left Edge | (80, 140) |
| ⋮ | ⋮ |

FIG. 3

| Feature Point | Average Coordinates |
| --- | --- |
| Left Eyebrow Outer Edge | (60, 60) |
| Left Eyebrow Inner Edge | (80, 62) |
| Left Eye Outer Edge | (50, 75) |
| Left Eye Inner Edge | (75, 80) |
| Nose Center | (100, 100) |
| Mouth Left Edge | (90, 150) |
| ⋮ | ⋮ |

FIG. 4

| Face Condition | Face Condition | Face Condition |
| --- | --- | --- |
| Normal | Surgical Mask On | Illuminated from Left |

Normal Surgical Mask On Illuminated from Left

FIG. 5

| Face Condition | Reference Point | Priorities |
|---|---|---|
| Normal | Midpoint between Outer Corners of Eyes | 1 |
| Sunglasses On | Tip of Nose | 2 |
| Surgical Mask On | Midpoint between Outer Corners of Eyes | 3 |
| Inclined Face | Midpoint between Outer Corners of Eyes | 4 |
| Uttering | Midpoint between Outer Corners of Eyes | 5 |
| Illuminated from Left | Tip of Nose | 6 |
| ⋮ | ⋮ | ⋮ |

Sunglasses On

Surgical Mask On

Normal

Inclined Face

Uttering

Illuminated from Left

FIG. 7

| Reference Point |
|---|
| Midpoint between Outer Corners of Eyes |

Normal

| Reference Point |
|---|
| Tip of Nose |

Sunglasses On

| Reference Point |
|---|
| Tip of Nose |

Illuminated from Left

Exemplary Feature Amount When Reference Point is Tip of Nose

Exemplary Feature Amount When Reference Point is Midpoint between Outer Corners of Eyes

FIG. 9

| Feature Amount | Value |
|---|---|
| V1 | 110 |
| V2 | 30 |
| V3 | 60 |
| : | : |

FIG. 10

| Feature Amount | Happiness Determination Condition | Surprise Determination Condition | Fear Determination Condition | Anger Determination Condition | Disgust Determination Condition | Sadness Determination Condition |
|---|---|---|---|---|---|---|
| V1 | V1 > 110 | V1 > 100 | V1 > 90 | V1 > 80 | V1 > 110 | V1 > 100 |
| V2 | V2 > 30 | V2 > 10 | V2 > 20 | V2 > 40 | V2 > 50 | V2 > 40 |
| V3 | V3 > 60 | V3 > 70 | V3 > 80 | V3 > 50 | V3 > 40 | V3 > 50 |
| .. | .. | .. | .. | .. | .. | .. |

EXPRESSION RECOGNITION DEVICE

TECHNICAL FIELD

The present invention relates to an expression recognition device for recognizing a facial expression of a person on the basis of an image capturing the person.

BACKGROUND ART

In recent years, development of systems that detect emotions of a user has been in progress in car navigation systems, home electric appliances, robots, etc., in order to implement a speech interaction function that changes response expressions such as guidance or conversation depending on emotions of a user.

For example, there is an increasing demand for a function of detecting emotions of a user by acquiring an image capturing the face of the user from a camera and recognizing the user's facial expression using the acquired image.

As one method of expression recognition, for example, the facial expression of a person is recognized from an image capturing the face of the person by using feature points such as the mouth or the eyes and extracting a feature amount necessary for recognition of the facial expression.

However, for example, when the person in the image wears an item such as sunglasses or a surgical mask, there are cases where a feature point for extracting a feature amount cannot be extracted, or the extraction accuracy of the feature point is low.

As technology for extracting a feature amount on the basis of feature points considering whether an item such as sunglasses or a surgical mask is worn, for example Patent Literature 1 discloses a face authentication system that performs face authentication with technology of face authentication by determining an extraction position of a feature amount depending on whether glasses are worn from an input face image, extracting the feature amount on the basis of the determined extraction position of a feature amount, and collating the extracted feature amount with a feature amount of a registered image.

In the technology disclosed in Patent Literature 1, face authentication can be performed regardless of whether the user in the input face image and the registered image wears glasses because when it is determined that the user in the input face image wears an item, the extraction position of a feature amount is determined while avoiding the position of the item worn.

CITATION LIST

Patent Literatures

Patent Literature 1: JP 2007-280250 A

SUMMARY OF INVENTION

Technical Problem

However, the technology disclosed in Patent Literature 1 is related to authentication of an individual using an image capturing the face of a person, and is not for recognizing the facial expression of a person. Therefore, in determining the extraction position of a feature amount for extracting a feature amount, it is not considered whether the extraction position of the feature amount is appropriate for performing expression recognition.

In a case where expression recognition of a person is performed using an image capturing the face of the person, a feature point used as a reference for extraction of a feature amount for expression recognition needs to have little variations due to a change in the facial expression. This is because if a feature point serving as a reference varies, an extracted feature amount also varies, and thus accurate expression recognition cannot be performed.

In addition, in the technology disclosed in Patent Literature 1, there is a possibility that a feature amount cannot be extracted because the extraction position of a feature amount is not determined depending on other factors such as the orientation of the face of a person, or the illumination environment, other than whether an item is worn.

Therefore, there is a disadvantage that the technology as disclosed in Patent Literature 1 cannot recognize the facial expression of a person.

The present invention has been made to solve the disadvantage as described above, and an object of the present invention is to provide an expression recognition device capable of performing expression recognition of a person in an image capturing the person.

Solution to Problem

An expression recognition device according to the present invention includes: processing circuitry to acquire an image, extract a face area of a person from the acquired and obtaining a face image added with information of the face area, extract one or more face feature points on a basis of the face image, determine a face condition representing a state of a face in the face image depending on reliability of each of the extracted face feature points determine a reference point for extraction of a feature amount used for expression recognition from among the extracted face feature points depending on the determined face condition, extract the feature amount on a basis of the determined reference point, recognize a facial expression of the person in the face image using the extracted feature amount, and output information related to a recognition result of the facial expression of the person in the face image.

Advantageous Effects of Invention

According to the present invention, it is possible to recognize a facial expression of a person in an image capturing the person by performing expression recognition based on feature points suitable for performing expression recognition.

BRIEF DESCRIPTION OF DRAWINGS

FIG. 2 is a table illustrating exemplary information of each face feature point recorded by a face feature point recording unit in the first embodiment.

FIG. 3 is a table illustrating exemplary information of face feature points of an average face defined by an average face feature point model in the first embodiment.

FIG. 4 are diagrams illustrating exemplary information related to a determination result of face conditions recorded by a face condition recording unit in the first embodiment.

FIG. 5 is a table illustrating an example of reference point determination conditions defined in a reference point determining condition model in the first embodiment.

FIG. 7 are diagrams illustrating exemplary information of reference points recorded by a reference point recording unit in the first embodiment.

FIG. 9 is a table illustrating exemplary information related to each feature amount recorded by a face feature amount recording unit in the first embodiment.

FIG. 10 is a table illustrating an example of the contents of an expression recognizing condition model included in a pre-generated database in the first embodiment.

DESCRIPTION OF EMBODIMENTS

Hereinafter, embodiments of the present invention will be described in detail with reference to the drawings.

First Embodiment

Figure 1:
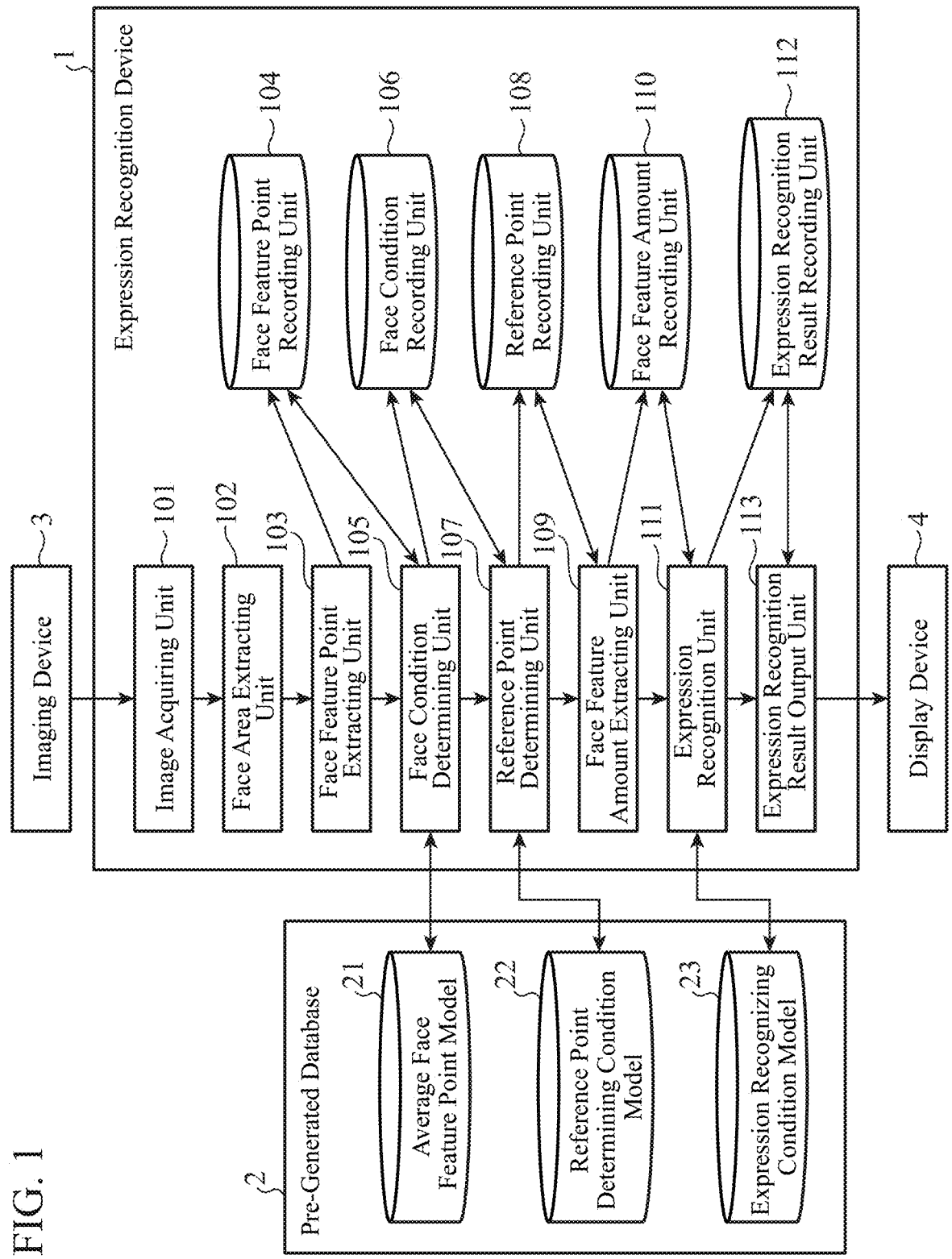
FIG. 1 is a block diagram illustrating an exemplary configuration of an expression recognition device according to a first embodiment.
Figure 6A:
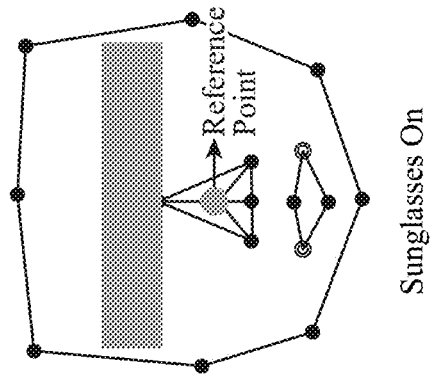
FIGS. 6A to 6F are diagrams for explaining an exemplary state of the face of a person in a face moving image in the first embodiment.
Figure 6B:
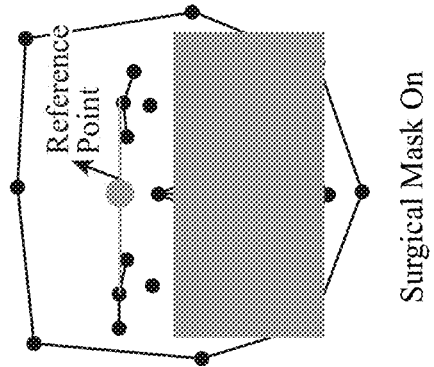
Figure 6C:
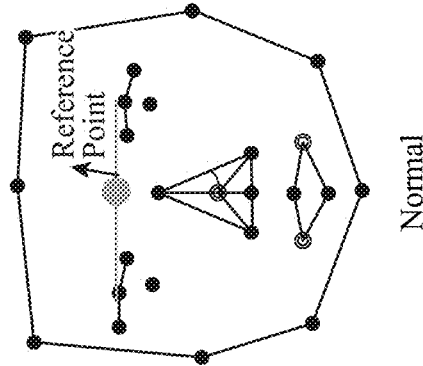
Figure 6D:
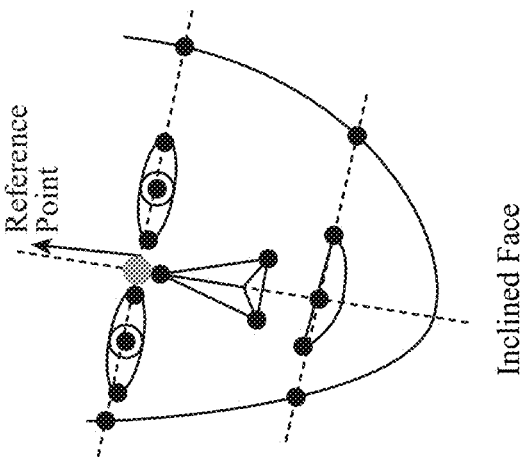
Figure 6E:
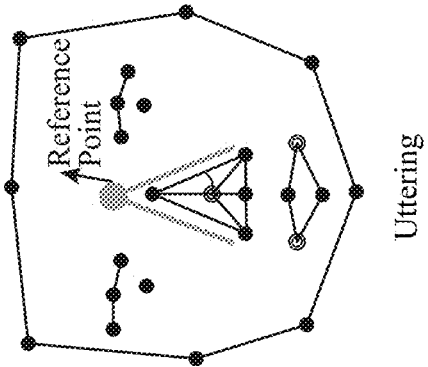
Figure 6F:
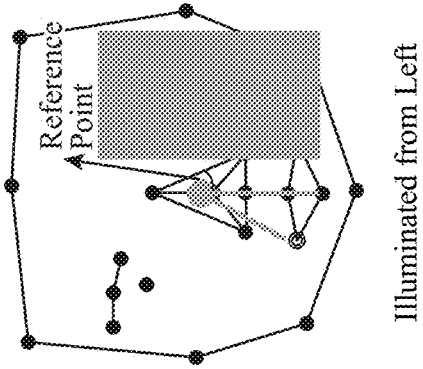

FIG. 1 is a block diagram illustrating an exemplary configuration of an expression recognition device 1 according to a first embodiment.

The expression recognition device 1 is connected with a pre-generated database 2, an imaging device 3, and a display device 4 as illustrated in FIG. 1.

The expression recognition device 1 includes an image acquiring unit 101, a face area extracting unit 102, a face feature point extracting unit 103, a face feature point recording unit 104, a face condition determining unit 105, a face condition recording unit 106, a reference point determining unit 107, a reference point recording unit 108, a face feature amount extracting unit 109, a face feature amount recording unit 110, an expression recognition unit 111, an expression recognition result recording unit 112, and an expression recognition result output unit 113 as illustrated in FIG. 1.

The image acquiring unit 101 acquires an image captured by the imaging device 3. The image acquiring unit 101 outputs the image acquired from the imaging device 3 to the face area extracting unit 102.

In the first embodiment, an image captured by the imaging device 3 and acquired by the image acquiring unit 101 may be a moving image or a still image. Hereinafter, explanation is given in the first embodiment, as an example, assuming that the imaging device 3 captures a moving image and that the image acquiring unit 101 acquires the moving image captured by the imaging device 3.

Note that expression recognition processing is performed for each frame of the moving image acquired by the image acquiring unit 101 in the expression recognition device 1.

The face area extracting unit 102 extracts an area indicating the face of a person (hereinafter referred to as the "face area") from the moving image acquired by the image acquiring unit 101. The face area extracting unit 102 is only required to extract a face area using existing technology. For example, Non-Patent Literature 1, "Paul Viola, Michael J. Jones. Robust Real-Time Face Detection. International Journal of Computer Vision. Vol. 57, No2 pp. 137-154 (2004)", describes the existing technology for extracting a face area.

The face area extracting unit 102 adds face area information to the moving image acquired by the image acquiring unit 101 and outputs the moving image to the face feature point extracting unit 103.

An image acquired by the image acquiring unit 101 from the imaging device 3 and added with face area information by the face area extracting unit 102 is referred to as a "face image".

In the first embodiment, the imaging device 3 captures a moving image, and the image acquiring unit 101 acquires the moving image. Therefore, a "face image" will be referred to as a "face moving image" in the explanation below.

The face feature point extracting unit 103 extracts feature points of the face (hereinafter referred to as "face feature points") on the basis of the face moving image output from the face area extracting unit 102.

In the first embodiment, a face feature point is a point on a part included in a human face, and refers to one or a plurality of points that markedly represents the feature of each part. Parts included in a human face may be, for example, the eyebrows, the eyes, the nose, or the mouth. One or a plurality of points that markedly represents the feature of each part may be, for example, the outer edge of the left eyebrow or the tip of the nose.

The face feature point extracting unit 103 extracts "the positions of the face feature points" as the face feature points. The "positions of the face feature points" are indicated by coordinates on the face moving image, for example.

The face feature point extracting unit 103 is only required to extract each face feature point using existing technology. The face feature point extracting unit 103 uses, as an existing technology for extracting face feature points, for example, a known method disclosed in Non-Patent Literature 2 "Wiskott L., Fellous J.-M., Kruger N., von der Malsburg C. Face Recognition by Elastic Bunch Graph Matching. IEEE Transactions on Pattern Analysis and Machine Intelligence, Vol. 19. Issue 7, pp. 775-779 (1997)".

The face feature point extracting unit 103 outputs the information of each extracted face feature point to the face feature point recording unit 104 for storage therein. Information of a face feature point indicates which face feature point of which part of the face the coordinates on the face moving image indicating the position of the face feature point extracted by the face feature point extracting unit 103 on the face moving image represent.

The face feature point recording unit 104 records information of each face feature point output by the face feature point extracting unit 103.

FIG. 2 is a table illustrating exemplary information of each face feature point recorded by the face feature point recording unit 104 in the first embodiment.

As illustrated in FIG. 2, information of each face feature point includes information of coordinates of each face feature point in the face moving image.

The coordinates of each face feature point are coordinates represented with the upper left coordinates of the face moving image being the origin (0, 0).

Although not illustrated in FIG. 2 for simplicity of explanation, in the information of each face feature point, coordinates of each face feature point and information for specifying which frame of the face moving image acquired by the image acquiring unit 101 is to be processed are associated with each other.

The face condition determining unit 105 determines face conditions representing the state of the face in the face moving image, such as whether the face in the face moving image is wearing any item or whether there is a shadow or washed-out colors on the basis of the information of each face feature point extracted by the face feature point extracting unit 103 and recorded in the face feature point recording unit 104.

Specifically, the face condition determining unit 105 determines the face condition depending on the reliability of each face feature point. In the first embodiment, the reliability of a face feature point refers to whether the face feature point is extracted with accuracy, and the face condition determining unit 105 determines that the reliability is high when the face feature point is extracted with accuracy and determines that the reliability is low when the face feature point is extracted without accuracy.

For example, in a case where the face feature point extracting unit 103 has not extracted a face feature point indicating the eyes, the face condition determining unit 105 determines that the reliability of face feature points indicating the eyes is low and determines the face condition as "sunglasses on". In a case where the face feature point extracting unit 103 has not extracted a face feature point indicating the mouth, the face condition determining unit 105 determines that the reliability of face feature points indicating the mouth is low and determines the face condition as "surgical mask on".

Furthermore, the face condition determining unit 105 may compare information related to a face feature point defined in an average face feature point model 21 (described later) with the information of the face feature point extracted by the face feature point extracting unit 103 on the basis of the average face feature point model 21 included in the pre-generated database 2 and determine the reliability of each face feature point in accordance with similarity between face feature points. For example, the face condition determining unit 105 performs the above comparison on coordinates of face feature points indicating the eyes, and as a result in a case where the difference between the two sets of coordinates is remarkably large, the face condition determining unit 105 determines that the similarity between the two sets of face feature points is low and that the reliability of the extracted face feature points indicating the eyes is low, and determines the face condition as "sunglasses on". In addition, for example, the face condition determining unit 105 performs the above comparison on coordinates of face feature points indicating the mouth, and as a result in a case where the difference between the two sets of coordinates is remarkably large, the face condition determining unit 105 determines that the similarity between the two sets of face feature points is low and that the reliability of the extracted face feature points indicating the mouth is low and determines the face condition as "surgical mask on". Furthermore, for example, the face condition determining unit 105 performs the above comparison on the distance between the outer edge of an eye and the inner edge of the eye, which are face feature points indicating the eye, and as a result in a case where the difference between the two distances is remarkably large, the face condition determining unit 105 determines in the comparison that the similarity of the distance between the outer edge of the eye and the inner edge of the eye, which are face feature points indicating the eye, is low and that the reliability of the extracted face feature points indicating the eye is low, and determines the face condition as "sunglasses on".

When the face condition determining unit 105 compares the information of face feature points defined in the average face feature point model 21 with the information of the face feature points extracted by the face feature point extracting unit 103, it suffices that, for example, a method using the Euclidean distance or the Mahalanobis distance be employed. Note that the face condition determining unit 105 normalizes the size of the face by, for example, matching the distance between the outer edges of the left eye and the right eye calculated from the information of the face feature points extracted by the face feature point extracting unit 103 with the distance between the outer edges of the left eye and the right eye calculated from the information of the face feature points defined in the average face feature point model 21. The plurality of face feature points used for normalization of the face size is only required to indicate the face size by the distance between the multiple face feature points, and the distance between the outer edges of the left eyebrow and the right eyebrow may be used.

Here, FIG. 3 is a table illustrating exemplary information of face feature points of an average face defined by the average face feature point model 21 in the first embodiment. Note that, in the first embodiment, the "average face" refers to a face obtained by superimposing moving images or still images capturing the faces of a plurality of persons and obtaining the average face of the plurality of persons.

As illustrated in FIG. 3, information related to face feature points of the average face, in which each face feature point of a person is associated with average coordinates of the face feature point in a face moving image, is defined in the average face feature point model 21. The average face feature point model 21 is generated in advance by an administrator or the like.

The face condition determining unit 105 may determine the face condition further by specifying a range of shadows or washed-out colors in the face moving image from information related to the illumination environment or an installation location of the imaging device 3, for example.

For example in a case where the illumination environment is known in advance, such as a state where the face of a person is illuminated from the left, the face condition determining unit 105 determines that there is a high possibility that the left half of the face has washed-out colors and that the reliability of face feature points executed by the face feature point extracting unit 103 in the left half of the face is low, and determines the face condition as "illuminated from the left".

Note that information related to the illumination environment or the installation location of the imaging device 3 is, for example, set in advance by an administrator or the like and recorded in a location that can be referred to by the expression recognition device 1.

In addition, in a case where the left half of the face is hidden due to the orientation of the face of a person, the face condition determining unit 105 determines that the reliability of face feature points executed by the face feature point extracting unit 103 in the range of the left half of the face is low, and determines the face condition as "inclined face".

In this manner, the face condition determining unit 105 can also determine the face condition for limiting face feature points to be used as a reference point so that the reference point determining unit 107 does not use a face feature point within a specific range as the reference point when determining the reference point. When the face condition determining unit 105 determines a face condition for limiting face feature points to be used as a reference point, the reference point determining unit 107 can determine a more appropriate reference point. The reference point determining unit 107 will be described later.

The face condition determining unit 105 outputs the information related to the determination result of the face condition to the face condition recording unit 106 for storage therein.

The face condition recording unit 106 records the information related to the determination result of the face condition output from the face condition determining unit 105.

Here, FIG. 4 are diagrams illustrating exemplary information related to a determination result of the face condition recorded by the face condition recording unit 106 in the first embodiment.

As illustrated in FIG. 4, in the face condition recording unit 106, information such as "normal", "surgical mask on", or "illuminated from the left" is recorded as information related to the determination result of the face condition.

For example, "normal" indicates a state in which a person wears no items on the face, the illumination environment or the like does not affect the image of the face of the person, and the face of the person is facing the front. For example, "surgical mask on" indicates a state in which a person wears a surgical mask on the face. Moreover, for example, "illuminated from the left" indicates a state in which the face of the person is illuminated from the left.

Note that although not illustrated in FIG. 4 for simplicity of explanation, information such as "normal", "surgical mask on", or "illuminated from the left" is recorded in association with the information for specifying which frame of the face moving image acquired by the image acquiring unit 101 is to be processed.

The reference point determining unit 107 determines a reference point for extraction of feature amounts used for expression recognition from among the face feature points extracted by the face feature point extracting unit 103 and recorded in the face feature point recording unit 104 depending on the face condition determined by the face condition determining unit 105 on the basis of a reference point determining condition model 22 (described later) included in the pre-generated database 2.

When expression recognition is performed in the expression recognition device 1 according to the first embodiment, some of face feature points extracted by the face feature point extracting unit 103 are used to recognize the facial expression from a feature amount extracted using the some of the face feature points as a reference. However, in order to accurately extract a feature amount used for recognition of the facial expression, it is necessary to extract, as a reference, face feature points whose variation due to the facial expression change is small. Furthermore, depending on various conditions under which face feature points are extracted, face feature points with low extraction accuracy may be included in the extracted face feature points. If a face feature point with low extraction accuracy is used as a reference for extraction of a feature amount, the feature amount is not extracted accurately, either.

Therefore, the reference point determining unit 107 determines a reference point serving as a reference for extraction of feature amounts used for expression recognition from among the face feature points extracted by the face feature point extracting unit 103 and recorded in the face feature point recording unit 104 depending on the face condition determined by the face condition determining unit 105 on the basis of the reference point determining condition model 22 having been generated in advance.

Note that in a case where there are multiple face conditions determined by the face condition determining unit 105, the reference point determining unit 107 determines a reference point depending on a face condition with a higher priority among the multiple face conditions on the basis of preset priorities. The priorities for determining a reference point are set in advance by an administrator or the like, and are defined in, for example, the reference point determining condition model 22 described later. For example, in a case where the face condition determining unit 105 has determined "surgical mask on" and "illuminated from left" as face conditions, and when a reference point is determined depending on the face condition "surgical mask on" the administrator or the like sets the priority of "surgical mask on" higher than the priority of "illuminated from the left".

Here, FIG. 5 is a table illustrating an example of reference point determination conditions defined in the reference point determining condition model 22 in the first embodiment.

As illustrated in FIG. 5, reference point determination conditions, in which face conditions, reference points, and priories of the face conditions for determining a reference point are associated with each other, are defined in the reference point determining condition model 22. The reference point determining condition model 22 is generated in advance by an administrator or the like.

A reference point associated with a face condition in the reference point determination condition is a face feature point suitable for extraction of a feature amount used for expression recognition among face feature points in the face area.

For example in a case where the face condition is "inclined face", it is defined not to use the tip of the nose as a reference point since it is protruded forward, but is defined to use the midpoint of the outer corners of the eyes, that is, the midpoint between the outer edge of the left eye and the outer edge of the right eye as the reference point.

Moreover, for example in a case where the face condition is "uttering", it is defined to lower the priority of usage of the corners of the mouth as reference points since the positions of the corners of the mouth vary, but is defined to use the midpoint between the outer corners of the eyes as the reference points.

Furthermore, for example in a case where the face condition is "illuminated from the left", it is defined not to use the midpoint between the outer corners of the eyes as the reference point since they cannot be extracted, and is defined to lower the priority of usage of the left corner of the mouth as a reference point since the detection accuracy of a feature amount is low, but is defined to use to the tip of the nose as a reference point.

The reference point determining unit 107 determines a reference point depending on the face condition on the basis of the reference point determining condition model 22 as illustrated in FIG. 5. A specific method for determining a reference point by the reference point determining unit 107 will be described. The reference point determining method is set in advance, and the reference point determining unit 107 determines a reference point in accordance with the preset reference point determining method. Note that it is assumed in the following description that, for example, states as illustrated in FIG. 6 are assumed as a state of the face of the person in the face moving image.

In general, there are some face feature points in the face of a person the positions of which hardly vary even if the facial expression changes in various manners. Therefore, several face feature points the positions of which hardly vary are specified in advance by an administrator or the like, and one reference point is registered in correspondence with each face condition as illustrated in FIG. 5.

Then when the system is in operation, the reference point determining unit 107 changes the face feature point to be used as a reference depending on a face condition as of the time when the actual moving image is captured. That is, it is not that the same reference point is always used regardless of the conditions, but the reference point is dynamically changed depending on a face condition.

The reference point determining unit 107 dynamically changes a face feature point to be used as a reference depending on a face condition to determine a reference point.

For example, when a person is wearing sunglasses (see FIG. 6A) as illustrated in FIGS. 6A to 6F, the administrator or the like avoids the midpoint of the outer corners of the eyes since the extraction accuracy of face feature points indicating the eyes is low but uses the tip of the nose as a reference point and registers it in the reference point determining condition model 22 in advance. The reference point determining unit 107 determines the tip of the nose as a reference point on the basis of the reference point determining condition model 22.

Alternatively, for example, when a surgical mask is worn (see FIG. 6B), the administrator or the like avoids the tip of the nose since the extraction accuracy of face feature points indicating the nose is low but uses the midpoint of the outer corners of the eyes as reference points and registers it in the reference point determining condition model 22 in advance. The reference point determining unit 107 sets the midpoint between the outer corners of the eyes as a reference point on the basis of the reference point determining condition model 22.

Further alternatively, for example at normal time (see FIG. 6C) there are no factors that lower the extraction accuracy of face feature points, and the administrator or the like uses the midpoint of the outer corners of the eyes as reference points and registers it in the reference point determining condition model 22 in advance. The reference point determining unit 107 sets the midpoint between the outer corners of the eyes as a reference point on the basis of the reference point determining condition model 22.

Alternatively, for example when the face of a person is inclined (see FIG. 6D), the administrator or the like avoids the tip of the nose since the tip of the nose is protruded forward and lowers the extraction accuracy but uses the midpoint of the outer corners of the eyes as reference points and registers it in the reference point determining condition model 22 in advance. The reference point determining unit 107 sets the midpoint between the outer corners of the eyes as a reference point on the basis of the reference point determining condition model 22.

For example when a person is uttering (see FIG. 6D), the administrator or the like avoids the mouth since the mouth is moving and the extraction accuracy of face feature points indicating the mouth is low, and uses the midpoint of the outer corners of the eyes as reference points and registers it in the reference point determining condition model 22 in advance. The reference point determining unit 107 sets the midpoint between the outer corners of the eyes as a reference point on the basis of the reference point determining condition model 22.

For example at the time of being illuminated from the left when the face of a person is illuminated from the left (see FIG. 6E), the administrator or the like uses the tip of the nose as a reference point and registers it in the reference point determining condition model 22 in advance since the extraction accuracy of face feature points indicating the left side of the face of the person is low and the midpoint of the outer corners of the eyes cannot be calculated. The reference point determining unit 107 determines the tip of the nose as a reference point on the basis of the reference point determining condition model 22.

The reference point determining unit 107 outputs the information of the determined reference point to the reference point recording unit 108 for storage therein.

The reference point recording unit 108 records the information of the reference point output from the reference point determining unit 107.

Here, FIG. 7 are diagrams illustrating exemplary information of reference points recorded by the reference point recording unit 108 in the first embodiment.

As illustrated in FIG. 7, the reference point recording unit 108 records information such as "midpoint between outer corners of eyes" or "tip of nose" as information of reference points.

Note that although not illustrated in FIG. 7 for simplicity of explanation, information of reference points such as "midpoint between outer corners of eyes" or "tip of nose" is recorded in association with information specifying which frame of the face moving image acquired by the image acquiring unit 101 is to be processed.

The face feature amount extracting unit 109 extracts each feature amount used for expression recognition on the basis of a reference point output from the reference point determining unit 107 and recorded in the reference point recording unit 108.

Figure 8B:
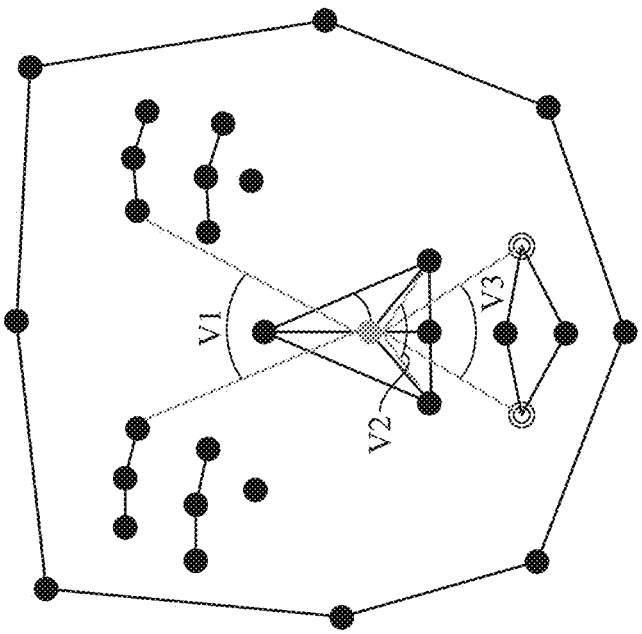
FIGS. 8A and 8B are diagrams for explaining an exemplary concept of each feature amount extracted by a face feature amount extracting unit in the first embodiment.
Figure 8A:
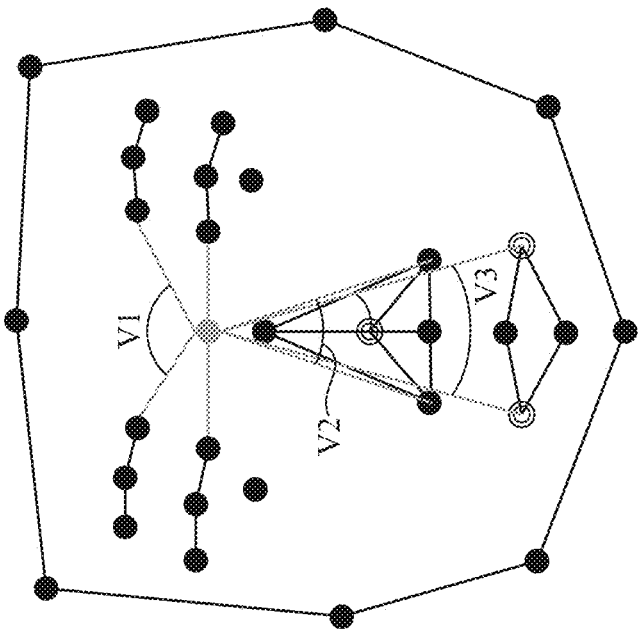

Here, FIGS. 8A and 8B are diagrams for explaining an exemplary concept of each feature amount extracted by the face feature amount extracting unit 109 in the first embodiment. FIG. 8A is a diagram illustrating an exemplary concept of a feature amount extracted by the face feature amount extracting unit 109 in a case where the reference point is the midpoint between the outer corners of the eyes, and FIG. 8B is a diagram illustrating an exemplary concept of a feature amount extracted by the face feature amount extracting unit 109 in a case where the reference point is the tip of the nose.

For example as illustrated in FIGS. 8A and 8B, an angle obtained by connecting the reference point and the inner edges of the both eyebrows (V1 in FIGS. 8A and 8B), an angle obtained by connecting the reference point and both ends at the bottom of the nose (V2 in FIGS. 8A and 8B), and an angle (V3) obtained by connecting the reference point and the left and right corners of the mouth are set as feature amounts. These are feature amounts that are known to represent features due to a change in the facial expression, such as lifted corners of the mouth, enlarged nostrils, or frowning.

The face feature amount extracting unit 109 extracts, for example, angles as indicated by V1 to V3 in FIGS. 8A and 8B as feature amounts used for expression recognition.

Although it has been described in FIGS. 8A and 8B that the face feature amount extracting unit 109 extracts the angles as the feature amounts used for expression recognition, this is merely an example. For example, the face feature amount extracting unit 109 may extract, as a feature amount used for expression recognition, a distance between a reference point and each face feature point, a direction from a reference point to each face feature point, or an angle other than the angles indicated by V1 to V3 in FIGS. 8A and 8B.

Although it has been described in the above description that the face feature amount extracting unit 109 extracts three feature amounts, this is merely an example, and the face feature amount extracting unit 109 is only required to extract one or more feature amounts.

In this manner, the face feature amount extracting unit 109 extracts each feature amount used for expression recognition using a reference point as a reference.

The face feature amount extracting unit 109 outputs the extracted feature amounts to the face feature amount recording unit 110 for storage therein.

The face feature amount recording unit 110 records the feature amounts output from the face feature amount extracting unit 109.

Figure 9:
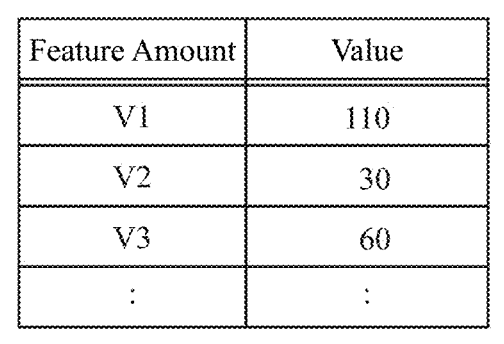

Here, FIG. 9 is a table illustrating exemplary information related to the feature amounts recorded by the face feature amount recording unit 110 in the first embodiment.

As illustrated in FIG. 9, the face feature amount recording unit 110 records a specific value of each of the feature amounts.

Note that although not illustrated in FIG. 9 for simplicity of explanation, information of the feature amounts is recorded in association with information specifying which frame of the face moving image acquired by the image acquiring unit 101 is to be processed.

The expression recognition unit 111 recognizes the facial expression of the person in the face moving image using each of the feature amounts extracted by the face feature amount extracting unit 109 and recorded in the face feature amount recording unit 110.

For example, the expression recognition unit 111 uses each of the feature amounts recorded in the face feature amount recording unit 110 to recognize the facial expression of the person in the face moving image on the basis of an expression recognizing condition model 23 (described later) included in the pre-generated database 2.

Specifically, for example, assuming that seven facial expressions of "straight face", "happiness", "surprise", "fear", "anger", "disgust", and "sadness" are recognized with respect to the facial expression of a person, the expression recognition unit 111 recognizes a facial expression having the largest number of feature amounts satisfying a threshold value as the facial expression of the person in the face moving image on the basis of a threshold value of each of the feature amounts for recognition of each of the facial expressions.

Note that the threshold value of each of the feature amounts for recognition of each facial expression is set in advance by the administrator or the like, and is defined in the expression recognizing condition model 23 as a facial expression determination condition. For example, in a case where a facial expression is recognized by lifted corners of the mouth, the administrator or the like sets "V3>45" or the like as the facial expression determination condition in advance.

Here, FIG. 10 is a table illustrating an example of the contents of the expression recognizing condition model 23 included in the pre-generated database 2 in the first embodiment.

As illustrated in FIG. 10, in the expression recognizing condition model 23, a feature amount for recognition of each of the facial expressions (here, the above seven facial expressions) is defined as an expression recognition conditions for each of the feature amounts recorded in the face feature amount recording unit 110.

The expression recognition unit 111 uses each of the feature amounts recorded in the face feature amount recording unit 110 to recognize the facial expression of the person in the face moving image on the basis of the expression recognizing condition model 23 as illustrated in FIG. 10.

Note that, in a case where a plurality of facial expressions is recognized as a result of recognizing the facial expression of the person in the face moving image on the basis of the expression recognizing condition model 23 using each of the feature amounts, it suffices that the expression recognition unit 111 set a facial expression with a high priority, for example, based on priorities of the facial expressions set in advance, as the facial expression of the person in the face moving image. It suffices that the priorities of the facial expressions be set in advance by the administrator or the like and be defined in the expression recognizing condition model 23.

Furthermore, in a case where a plurality of facial expressions is recognized, the expression recognition unit 111 may, for example, determine the facial expression of the person in the face moving image as "cannot be determined".

Note that although the expression recognition unit 111 recognizes the facial expression of the person in the face moving image on the basis of the expression recognizing condition model 23 as illustrated in FIG. 10 in the first embodiment, this is merely an example. The expression recognition unit 111 may recognize the facial expression of the person in the face moving image by known technology of machine learning such as the random forest, the support vector machine (SVM), the Adaboost, or the convolutional neural network (CNN) using, for example, each of the feature amounts recorded in the face feature amount recording unit 110.

The expression recognition unit 111 outputs information related to the recognition result of the facial expression of the person in the face moving image to the expression recognition result recording unit 112 for storage therein.

The expression recognition result recording unit 112 records information related to the recognition result of the facial expression output from the expression recognition unit 111.

Figure 11:
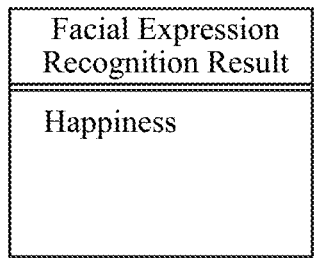
FIG. 11 is a diagram illustrating exemplary information related to a recognition result of a facial expression of a person in a face moving image recorded by an expression recognition result recording unit in the first embodiment.

Here, FIG. 11 is a diagram illustrating exemplary information related to a recognition result of a facial expression of a person in a face moving image recorded by the expression recognition result recording unit 112 in the first embodiment.

As illustrated in FIG. 11, the expression recognition result recording unit 112 records information indicating the recognition result of the facial expression of the person in the face moving image.

Note that although not illustrated in FIG. 11 for simplicity of explanation, information indicating the recognition result of the facial expression of the person in the face moving image is recorded in association with information specifying which frame of the face moving image acquired by the image acquiring unit 101 is to be processed.

The expression recognition result output unit 113 outputs, to the display device 4, information related to the recognition result of the facial expression of the person in the face moving image recognized by the expression recognition unit 111 and recorded in the expression recognition result recording unit 112.

Although it has been described in FIG. 1 that the face feature point recording unit 104, the face condition recording unit 106, the reference point recording unit 108, the face feature amount recording unit 110, and the expression recognition result recording unit 112 are included in the expression recognition device 1, without limiting to this, the face feature point recording unit 104, the face condition recording unit 106, the reference point recording unit 108, the face feature amount recording unit 110, and the expression recognition result recording unit 112 may be provided at a place external to the expression recognition device 1 where the expression recognition device 1 can refer to.

The pre-generated database 2 includes the average face feature point model 21, the reference point determining condition model 22, and the expression recognizing condition model 23. Each model is generated in advance by the administrator or the like and is stored in the pre-generated database 2.

As described with reference to FIG. 3, information related to face feature points of the average face, in which each face feature point of a person is associated with average coordinates of the face feature point in a face moving image, is defined in the average face feature point model 21.

As described with reference to FIG. 5, reference point determination conditions, in which face conditions, reference points, and priories of the face conditions for determining a reference point are associated with each other, are defined in the reference point determining condition model 22.

In the expression recognizing condition model 23, a determination condition for a feature amount for recognition of each of the facial expressions is defined as an expression recognition condition for each of the feature amounts as illustrated using FIG. 10.

The imaging device 3 is, for example, a camera.

The display device 4 is, for example, a liquid crystal screen.

Next, the operation of the expression recognition device 1 according to the first embodiment will be described.

Figure 12:
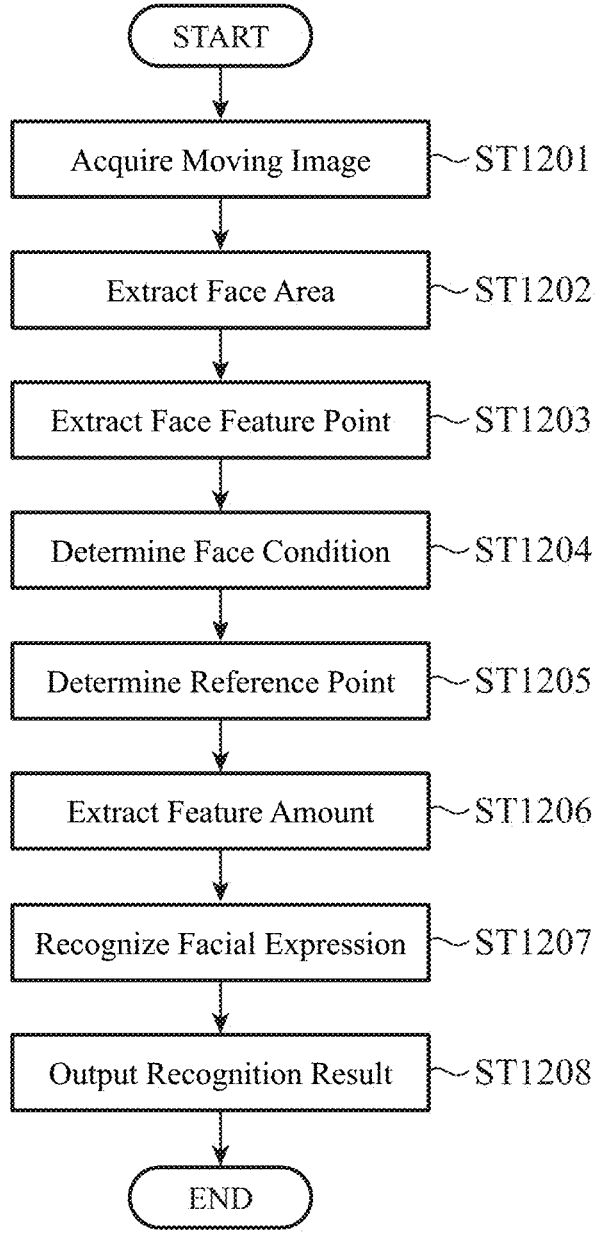
FIG. 12 is a flowchart for explaining the operation of the expression recognition device according to the first embodiment.

FIG. 12 is a flowchart for explaining the operation of the expression recognition device 1 according to the first embodiment.

The image acquiring unit 101 acquires a moving image captured by the imaging device 3 (step ST1201). The image acquiring unit 101 outputs the moving image acquired from the imaging device 3 to the face area extracting unit 102.

The face area extracting unit 102 extracts a face area of a person from the moving image output from the image acquiring unit 101 in step ST1201 (step ST1202). The face area extracting unit 102 outputs the face moving image to the face feature point extracting unit 103.

The face feature point extracting unit 103 extracts face feature points on the basis of the face moving image output from the face area extracting unit 102 in step ST1202 (step ST1203).

The face feature point extracting unit 103 outputs the information of the extracted face feature points to the face feature point recording unit 104 for storage therein.

The face condition determining unit 105 determines face conditions such as whether the face of the person in the face moving image is wearing any item or whether there is a shadow or washed-out colors on the basis of the information of face feature points output by the face feature point extracting unit 103 and recorded in the face feature point recording unit 104 in step ST1203 (step ST1204).

Figure 13:
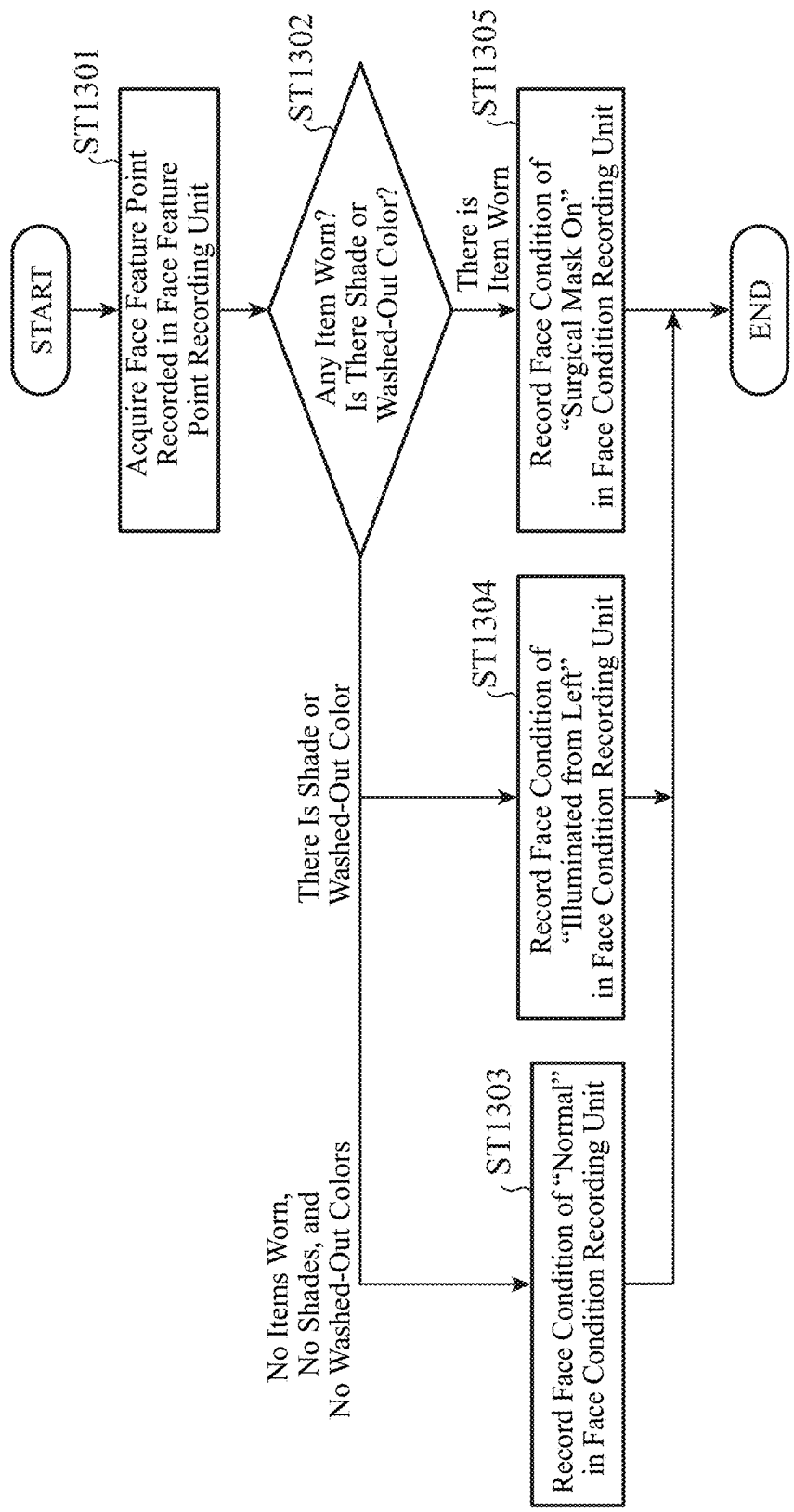
FIG. 13 is a flowchart for explaining the operation of step ST1204 of FIG. 12.

Here, FIG. 13 is a flowchart for explaining the operation of step ST1204 of FIG. 12.

The operation of the face condition determining unit 105 will be described with reference to FIG. 13.

The face condition determining unit 105 acquires information of the face feature points recorded in the face feature point recording unit 104 (step ST1301).

The face condition determining unit 105 determines whether the face in the face moving image is wearing any item, or whether there is a shadow or washed-out colors (step ST1302).

If it is determined as "no item worn, no shades, and no washed-out colors" in step ST1302, the face condition determining unit 105 causes the face condition recording unit 106 to record the information of the face condition "normal" (step ST1303).

If it is determined in step ST1302 that "there is shadow or washed-out color", the face condition determining unit 105 causes the face condition recording unit 106 to record the information of the face condition indicating the state of presence of shadows or washed-out colors. For example, if the face of the person in the face moving image is illuminated from the left, the face condition determining unit 105 causes the face condition recording unit 106 to record information of the face condition "illuminated from the left" (step ST1304).

If it is determined in step ST1302 that "there is an item worn", the face condition determining unit 105 causes the face condition recording unit 106 to record the information of the face condition indicating the state where an item is worn. For example, if a person in the face moving image is wearing a surgical mask on the face, the face condition determining unit 105 causes the face condition recording unit 106 to record information of the face condition "surgical mask on" (step ST1305).

Let us refer back to the flowchart of FIG. 12.

The reference point determining unit 107 determines a reference point for extracting a feature amount used for expression recognition depending on the face condition determined by the face condition determining unit 105 in step ST1204 on the basis of the reference point determining condition model 22 (step ST1205).

Figure 14:
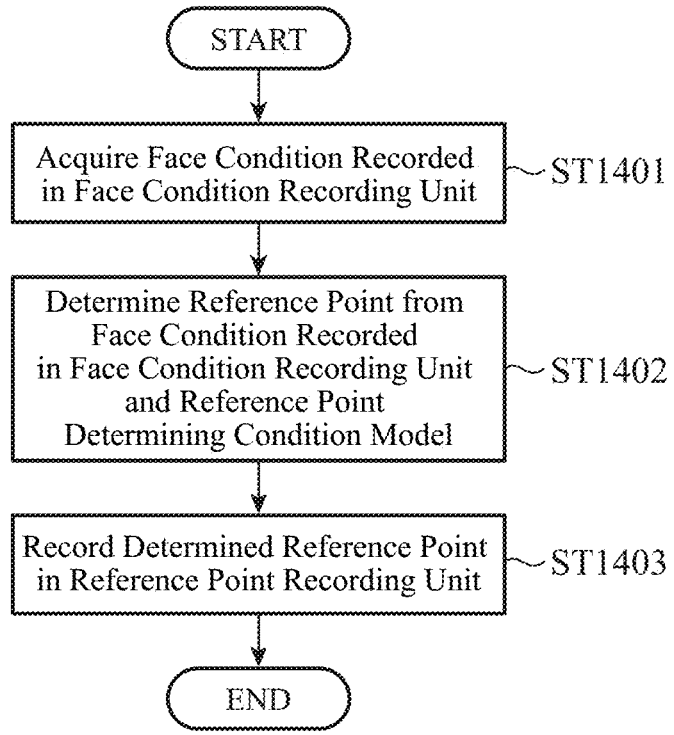
FIG. 14 is a flowchart for explaining the operation of step ST1205 of FIG. 12.

Here, FIG. 14 is a flowchart for explaining the operation of step ST1205 of FIG. 12.

The operation of the reference point determining unit 107 will be explained with reference to FIG. 14.

The reference point determining unit 107 acquires the face condition recorded in the face condition recording unit 106 (step ST1401).

The reference point determining unit 107 determines a reference point depending on the face condition acquired in step ST1401 on the basis of the reference point determining condition model 22 (see FIG. 5) (step ST1402).

The reference point determining unit 107 outputs the information of the determined reference point to the reference point recording unit 108 for storage therein (step ST1403).

Let us refer back to the flowchart of FIG. 12.

Face feature amount extracting unit 109 extracts a feature amount used for expression recognition on the basis of the reference point determined by the reference point determining unit 107 in step ST1205 (step ST1206).

Figure 15:
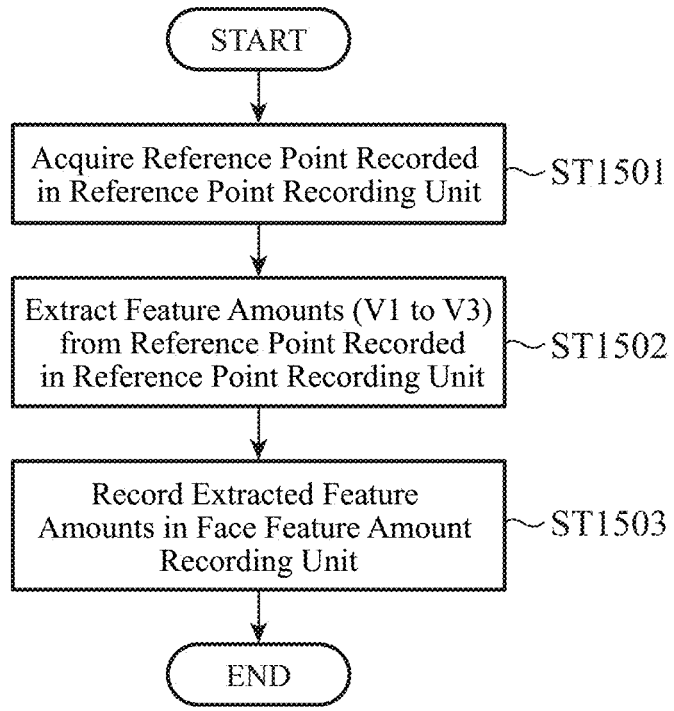
FIG. 15 is a flowchart for explaining the operation of step ST1206 of FIG. 12.

Here, FIG. 15 is a flowchart for explaining the operation of step ST1206 of FIG. 12.

The operation of the face feature amount extracting unit 109 will be explained with reference to FIG. 15.

The face feature amount extracting unit 109 acquires the information of the reference point recorded in the reference point recording unit 108 (step ST1501).

The face feature amount extracting unit 109 extracts a feature amount on the basis of the information of the reference point acquired in step ST1501 (step ST1502). As described above, the face feature amount extracting unit 109 sets, as feature amounts, for example the angle obtained by connecting the reference point and the inner edges of the both eyebrows (see V1 in FIGS. 8A and 8B), the angle obtained by connecting the reference point and both ends at the bottom of the nose (see V2 in FIGS. 8A and 8B), and the angle (see V3 in FIGS. 8A and 8B) obtained by connecting the reference point and the left and right corners of the mouth.

The face feature amount extracting unit 109 causes the face feature amount recording unit 110 to record the extracted feature amount (step ST1503).

Let us refer back to the flowchart of FIG. 12.

The expression recognition unit 111 recognizes the facial expression of the person in the face moving image using each of the feature amounts extracted by the face feature amount extracting unit 109 and recorded in the face feature amount recording unit 110 in step ST1206 (step ST1207).

In the first embodiment, the expression recognition unit 111 uses each of the feature amounts recorded in the face feature amount recording unit 110 to recognize the facial expression of the person in the face moving image on the basis of the expression recognizing condition model 23 included in the pre-generated database 2.

Figure 16:
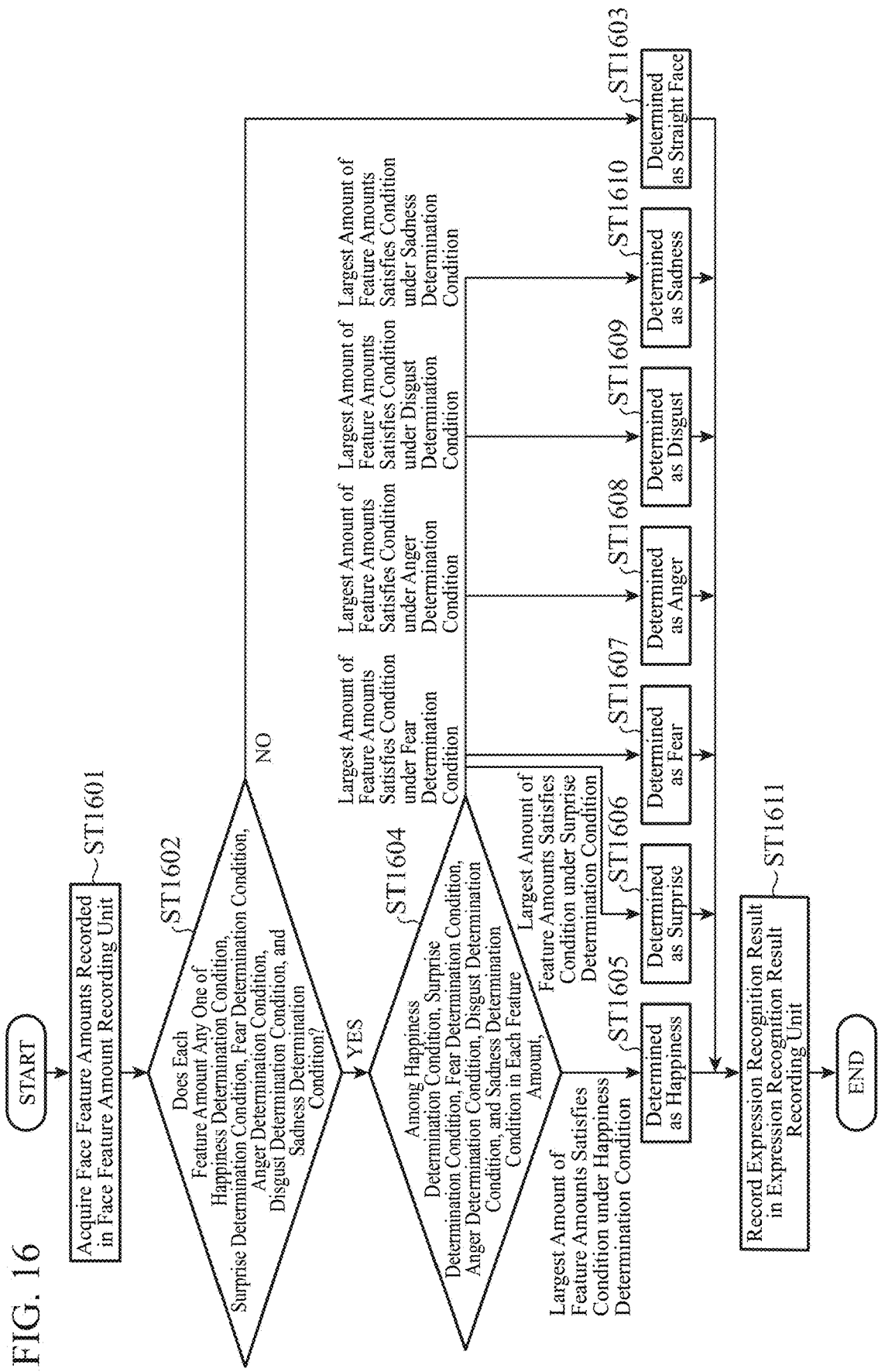
FIG. 16 is a flowchart for explaining the operation of step ST1207 of FIG. 12.

Here, FIG. 16 is a flowchart for explaining the operation of step ST1207 of FIG. 12.

The operation of the expression recognition unit 111 will be explained with reference to FIG. 16.

Note that in the following description of the operation, it is assumed that the expression recognition unit 111 recognizes, for example, seven facial expressions of "straight face", "happiness", "surprise", "fear", "anger", "disgust", and "sadness" for the facial expression of a person. It is also assumed that the expression recognizing condition model 23 has contents as illustrated in FIG. 10.

It is also assumed that each of the feature amounts recorded in the face feature amount recording unit 110 are the angle obtained by connecting the reference point and the inner edges of the both eyebrows (see V1 in FIGS. 8A and 8B), the angle obtained by connecting the reference point and both ends at the bottom of the nose (see V2 in FIGS. 8A and 8B), and the angle (see V3) obtained by connecting the reference point and the left and right corners of the mouth.

The expression recognition unit 111 acquires the feature amounts V1 to V3 recorded in the face feature amount recording unit 110 (step ST1601).

The expression recognition unit 111 determines whether each of the feature amounts V1 to V3 acquired in step ST1601 satisfies any one of the facial expression determination conditions (happiness determination condition, surprise determination condition, fear determination condition, anger determination condition, disgust determination condition, and sadness determination condition) for the feature amounts V1 to V3 defined in the expression recognizing condition model 23 (step ST1602).

If it is determined in step ST1602 that none of the feature amounts V1 to V3 acquired in step ST1601 satisfies the facial expression determination conditions for each of the feature amounts V1 to V3 (in the case of "NO" in step ST1602), the expression recognition unit 111 recognizes the facial expression of the person in the face moving image as "straight face" (step ST1603).

If it is determined in step ST1602 that one of the feature amounts V1 to V3 acquired in step ST1601 satisfies any one of the facial expression determination conditions for each of the feature amounts V1 to V3 (in the case of "YES" in step ST1602), the expression recognition unit 111 determines which one of the happiness determination condition, the surprise determination condition, the fear determination condition, the anger determination condition, the disgust determination condition, and the sadness determination condition the largest amount of the feature amounts V1 to V3 satisfies the condition (step ST1604).

If it is determined in step ST1604 that a condition that the largest amount of the feature amounts V1 to V3 satisfies is the happiness determination condition, the expression recognition unit 111 recognizes the facial expression of the person in the face moving image as "happiness" (step ST1605).

If it is determined in step ST1604 that a condition that the largest amount of the feature amounts V1 to V3 satisfies is the surprise determination condition, the expression recognition unit 111 recognizes the facial expression of the person in the face moving image as "surprise" (step ST1606).

If it is determined in step ST1604 that a condition that the largest amount of the feature amounts V1 to V3 satisfies is the fear determination condition, the expression recognition unit 111 recognizes the facial expression of the person in the face moving image as "fear" (step ST1607).

If it is determined in step ST1604 that a condition that the largest amount of the feature amounts V1 to V3 satisfies is the anger determination condition, the expression recognition unit 111 recognizes the facial expression of the person in the face moving image as "anger" (step ST1608).

If it is determined in step ST1604 that a condition that the largest amount of the feature amounts V1 to V3 satisfies is the disgust determination condition, the expression recognition unit 111 recognizes the facial expression of the person in the face moving image as "disgust" (step ST1609).

If it is determined in step ST1604 that a condition that the largest amount of the feature amounts V1 to V3 satisfies is not the disgust determination condition, the expression recognition unit 111 recognizes the facial expression of the person in the face moving image as "sadness" (step ST1610).

The expression recognition unit 111 causes the expression recognition result recording unit 112 to record information related to the recognition result of the facial expression of the person in the face moving image (step ST1611).

Let us refer back to the flowchart of FIG. 12.

The expression recognition result output unit 113 outputs, to the display device 4, information related to the recognition result of the facial expression of the person in the face area moving image which the expression recognition unit 111 caused the expression recognition result recording unit 112 to record therein in step ST1207 (step ST1208).

As described above, the expression recognition device 1 recognizes the facial expression of the person captured in the moving image from the moving image captured by the imaging device 3.

Since the conventional individual authentication technology as described above is technology for performing individual authentication, it is not considered whether the extraction position of a feature amount is appropriate for performing expression recognition in determining the extraction position of a feature amount for extracting the feature amount.

In addition, in the conventional individual authentication technology as described above, the extraction position of a feature amount is determined on the basis of whether an item is worn. However, in the conventional individual authentication technology, the extraction position of a feature amount is not determined depending on factors other than the orientation of the face of a person, the illumination environment, or whether an item is worn. As a result, there is a possibility that a feature amount cannot be extracted with accuracy.

In contrast, in the expression recognition device 1 according to the first embodiment, several face feature points the positions of which hardly vary are specified in advance by an administrator or the like, and one reference point is registered in the reference point determining condition model 22 in correspondence with each face condition.

Moreover, the face condition determining unit 105 determines the face condition in consideration of not only whether an item is worn but also other factors that lower the extraction accuracy of face feature points, other than the item worn, and the reference point determining unit 107 determines a reference point for extraction of a feature amount used for expression recognition from among face feature points on the basis of the face condition determined by the face condition determining unit 105 and the reference registered in the reference point determining condition model 22.

This allows the expression recognition device 1 to extract a feature amount on the basis of a reference point suitable for expression recognition excluding face feature points that are assumed to have low extraction accuracy. As a result, it becomes possible to recognize the facial expression of the person in the image with accuracy.

Figure 17A:
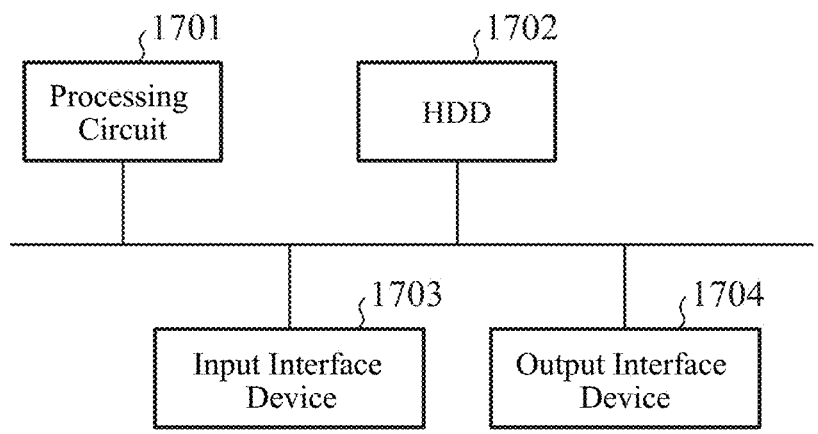
FIGS. 17A and 17B are diagrams each illustrating an exemplary hardware configuration of the expression recognition device according to the first embodiment.
Figure 17B:
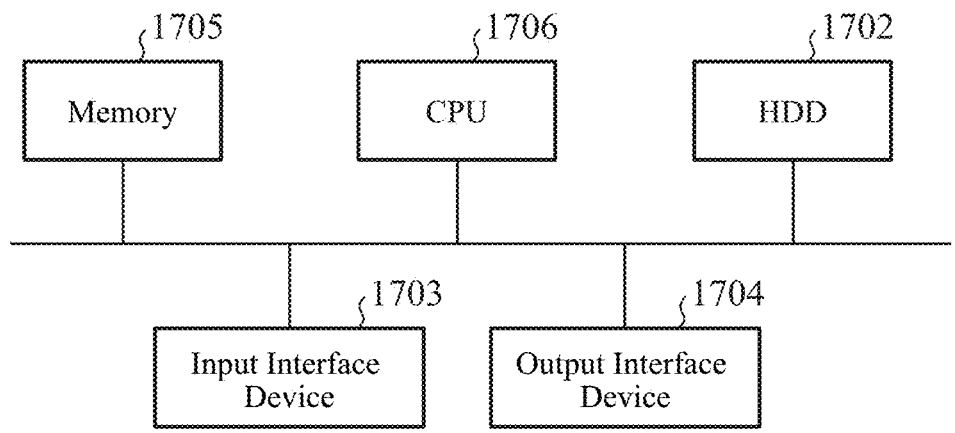

FIGS. 17A and 17B are diagrams each illustrating an exemplary hardware configuration of the expression recognition device 1 according to the first embodiment.

In the first embodiment, the functions of the image acquiring unit 101, the face area extracting unit 102, the face feature point extracting unit 103, the face condition determining unit 105, the reference point determining unit 107, the face feature amount extracting unit 109, the expression recognition unit 111, and the expression recognition result output unit 113 are implemented by a processing circuit 1701. In other words, the expression recognition device 1 includes the processing circuit 1701 for controlling processing of recognizing the facial expression of a person in a moving image acquired from the imaging device 3 on the basis of the moving image acquired from the imaging device 3 and the average face feature point model 21, the reference point determining condition model 22, and the expression recognizing condition model 23 stored in the pre-generated database 2.

The processing circuit 1701 may be dedicated hardware as illustrated in FIG. 17A or may be a central processing unit (CPU) 1706 for executing a program stored in a memory 1705 as illustrated in FIG. 17B.

In a case where the processing circuit 1701 is dedicated hardware, the processing circuit 1701 corresponds to, for example, a single circuit, a composite circuit, a programmed processor, a parallel programmed processor, an application specific integrated circuit (ASIC), a field-programmable gate array (FPGA), or a combination thereof.

In the case where the processing circuit 1701 corresponds to the CPU 1706, the respective functions of the image acquiring unit 101, the face area extracting unit 102, the face feature point extracting unit 103, the face condition determining unit 105, the reference point determining unit 107, the face feature amount extracting unit 109, the expression recognition unit 111, and the expression recognition result output unit 113 are implemented by software, firmware, or a combination of software and firmware. That is, the image acquiring unit 101, the face area extracting unit 102, the face feature point extracting unit 103, the face condition determining unit 105, the reference point determining unit 107, the face feature amount extracting unit 109, the expression recognition unit 111, and the expression recognition result output unit 113 are implemented by the CPU 1706 and a processing circuit such as a system large scale integration (LSI) that execute programs stored in a hard disk drive (HDD) 1702, the memory 1705, and the like. It can also be said that the programs stored in the HDD 1702, the memory 1705, or the like cause a computer execute the procedures or methods of the image acquiring unit 101, the face area extracting unit 102, the face feature point extracting unit 103, the face condition determining unit 105, the reference point determining unit 107, the face feature amount extracting unit 109, the expression recognition unit 111, and the expression recognition result output unit 113. Here, the memory 1705 may be a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, a digital versatile disc (DVD), or the like.

Note that some of the respective functions of the image acquiring unit 101, the face area extracting unit 102, the face feature point extracting unit 103, the face condition determining unit 105, the reference point determining unit 107, the face feature amount extracting unit 109, the expression recognition unit 111, and the expression recognition result output unit 113 may be implemented by dedicated hardware, and some may be implemented by software or firmware. For example, the function of the image acquiring unit 101 can be implemented by the processing circuit 1701 as dedicated hardware, and the functions of the face area extracting unit 102, the face feature point extracting unit 103, the face condition determining unit 105, the reference point determining unit 107, the face feature amount extracting unit 109, the expression recognition unit 111, and the expression recognition result output unit 113 can be implemented by the processing circuit reading and executing the programs stored in the memory 1705.

For the face feature point recording unit 104, the face condition recording unit 106, the reference point recording unit 108, the face feature amount recording unit 110, and the expression recognition result recording unit 112, for example, the HDD 1702 is used. Note that this is merely an example, and the face feature point recording unit 104, the face condition recording unit 106, the reference point recording unit 108, the face feature amount recording unit 110, and the expression recognition result recording unit 112 may be a DVD, the memory 1705, or the like.

The expression recognition device 1 further includes an input interface device 1703 and an output interface device 1704 that communicates with an external device such as the imaging device 3, the pre-generated database 2, or the display device 4.

In the above description, the face feature points extracted by the face feature point extracting unit 103, the face condition determined by the face condition determining unit 105, the reference point determined by the reference point determining unit 107, the face feature amount extracted by the face feature amount extracting unit 109, and the information of the facial expression recognized by the expression recognition unit 111 are recorded in the face feature point recording unit 104, the face condition recording unit 106, the reference point recording unit 108, the face feature amount recording unit 110, and the expression recognition result recording unit 112, respectively. Moreover, the face condition determining unit 105, the reference point determining unit 107, the face feature amount extracting unit 109, the expression recognition unit 111, and the expression recognition result output unit 113 perform various types of operation as described with reference to FIG. 12 on the basis of the various types of information recorded in the face feature point recording unit 104, the face condition recording unit 106, the reference point recording unit 108, the face feature amount recording unit 110, and the expression recognition result recording unit 112.

However, not limited to this, the face feature point recording unit 104, the face condition recording unit 106, the reference point recording unit 108, the face feature amount recording unit 110, and the expression recognition result recording unit 112 may not be included, and the face condition determining unit 105, the reference point determining unit 107, the face feature amount extracting unit 109, the expression recognition unit 111, and the expression recognition result output unit 113 may perform various types of operation by receiving, directly from the respective units, the face feature points extracted by the face feature point extracting unit 103, the face condition determined by the face condition determining unit 105, the reference point determined by the reference point determining unit 107, the face feature amount extracted by the face feature amount extracting unit 109, and the information of the facial expression recognized by the expression recognition unit 111, respectively.

As described above, the expression recognition device 1 according to the first embodiment includes: the image acquiring unit 101 for acquiring an image; the face area extracting unit 102 for extracting a face area of a person from the image acquired by the image acquiring unit 101 and obtaining a face image added with information of the face area; the face feature point extracting unit 103 for extracting one or more face feature points on the basis of the face image; the face condition determining unit 105 for determining a face condition representing a state of a face in the face image depending on reliability of each of the face feature points extracted by the face feature point extracting unit 103; the reference point determining unit 107 for determining a reference point for extraction of a feature amount used for expression recognition from among the face feature points extracted by the face feature point extracting unit 103 depending on the face condition determined by the face condition determining unit 105; the face feature amount extracting unit 109 for extracting the feature amount on the basis of the reference point determined by the reference point determining unit 107; the expression recognition unit 111 for recognizing a facial expression of the person in the face image using the feature amount extracted by the face feature amount extracting unit 109; and the expression recognition result output unit 113 for outputting information related to a recognition result of the facial expression of the person in the face image by the expression recognition unit 111. Therefore, it is possible to recognize a facial expression of a person in an image capturing the person by performing expression recognition on the basis of feature points suitable for performing expression recognition.

Note that the present invention may include modifications of any component of the embodiments, or omission of any component of the embodiments within the scope of the present invention.

INDUSTRIAL APPLICABILITY

An expression recognition device according to the present invention is capable of recognizing the facial expression of a person accurately in an image capturing the person by performing expression recognition referring to feature points suitable for expression recognition, and thus is applicable as an expression recognition device that recognizes the facial expression of the person on the basis of the image capturing the person.

REFERENCE SIGNS LIST

1: Expression recognition device, 2: Pre-generated database, 3: Imaging device, 4: Display device, 21: Average face feature point model, 22: Reference point determining condition model, 23: Expression recognizing condition model, 101: Image acquiring unit, 102: Face area extracting unit, 103: Face feature point extracting unit, 104: Face feature point recording unit, 105: Face condition determining unit, 106: Face condition recording unit, 107: Reference point determining unit, 108: Reference point recording unit, 109: Face feature amount extracting unit, 110: Face feature amount recording unit, 111: Expression recognition unit, 112: Expression recognition result recording unit, 113: Expression recognition result output unit, 1701: Processing circuit, 1702: HDD, 1703: Input interface device, 1704: Output interface device, 1705: Memory, 1706: CPU.

The invention claimed is:

1. An expression recognition device comprising:
processing circuitry to
acquire an image;
extract a face area of a person from the acquired image and obtaining a face image added with information of the face area;
extract one or more face feature points on a basis of the face image;
determine a face condition representing a state of a face in the face image depending on reliability of each of the extracted face feature points;
determine a reference point that is to be used for extraction of a feature amount used for expression recognition from among the extracted face feature points depending on the determined face condition, wherein the reference point is determined on the basis of a pre-generated reference point determining condition model in which face conditions, reference points, and priories of the face conditions for determining a reference point are associated with each other are defined;
extract the feature amount on a basis of the determined reference point;
recognize a facial expression of the person in the face image using the extracted feature amount; and
output information related to a recognition result of the facial expression of the person in the face image.

2. The expression recognition device according to claim 1,
wherein the processing circuitry determines a face condition indicating whether the face in the face image is wearing an item depending on reliability of each of the face feature points.

3. The expression recognition device according to claim 1,
wherein the processing circuitry determines the face condition depending on reliability of each of the face feature points based on an illumination environment in which the face image has been captured.

4. The expression recognition device according to claim 1,
wherein the processing circuitry determines a face condition indicating whether the face in the face image has a shadow or a washed-out color depending on reliability of each of the face feature points.

5. The expression recognition device according to claim 1,
wherein the processing circuitry determines the face condition by determining reliability of the face feature points on a basis of a comparison result between each of the extracted face feature points and each of face feature points in an average face defined by an average face feature point model.

6. The expression recognition device according to claim 5,
wherein the processing circuitry determines reliability of each of the face feature points on a basis of similarity between each of the face feature points in the average face and each of the extracted face feature points.

7. The expression recognition device according to claim 5,
wherein the processing circuitry determines reliability of each of the face feature points on a basis of similarity between a distance between the face feature points in the average face and a distance between the extracted face feature points.

* * * * *